United States Patent
Li

(10) Patent No.: US 9,554,342 B2
(45) Date of Patent: Jan. 24, 2017

(54) METHOD AND APPARATUS FOR EARLY TERMINATION OF TRANSMISSION

(71) Applicant: MediaTek Inc., Hsin-Chu, PA (US)

(72) Inventor: Xiu-Sheng Li, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 164 days.

(21) Appl. No.: 14/138,614

(22) Filed: Dec. 23, 2013

(65) Prior Publication Data

US 2014/0334363 A1 Nov. 13, 2014

Related U.S. Application Data

(60) Provisional application No. 61/821,332, filed on May 9, 2013.

(51) Int. Cl.
*H04J 3/08* (2006.01)
*H04W 52/44* (2009.01)
*H04W 52/58* (2009.01)

(52) U.S. Cl.
CPC ............ *H04W 52/44* (2013.01); *H04W 52/58* (2013.01)

(58) Field of Classification Search
CPC .............................. H04W 52/58; H04W 52/44
USPC ................. 370/311, 335, 336, 326, 328–331
See application file for complete search history.

(56) References Cited

U.S. PATENT DOCUMENTS

| 9,408,207 B2* | 8/2016 | Sambhwani | H04L 1/08 |
| 2012/0243515 A1* | 9/2012 | Xue | H03M 13/23 370/336 |
| 2012/0281675 A1* | 11/2012 | Liang | H04L 1/1854 370/331 |
| 2013/0223364 A1* | 8/2013 | Akkarakaran | H04L 1/1607 370/329 |
| 2014/0153417 A1* | 6/2014 | Gupta | H04W 52/0219 370/252 |
| 2014/0169273 A1* | 6/2014 | Chizgi | H04L 1/0039 370/328 |
| 2014/0293847 A1* | 10/2014 | Tsai | H04L 5/14 370/281 |
| 2014/0362832 A1* | 12/2014 | Rudolf | H04L 1/1822 370/336 |
| 2015/0223237 A1* | 8/2015 | Sambhwani | H04L 1/08 370/336 |

OTHER PUBLICATIONS

U.S. Appl. No. 61/738,115, filed Dec. 17, 2012.*

* cited by examiner

*Primary Examiner* — Chuong T Ho
(74) *Attorney, Agent, or Firm* — McClure, Qualey & Rodack, LLP

(57) ABSTRACT

A method for early termination of transmission is disclosed. The method includes: receiving downlink (DL) data from a DL channel during a transmission time interval (TTI); attempting to decode the received DL data before receiving all DL data of the TTI; and transmitting an early termination indicator (ETI) in an uplink (UL) slot of a UL radio frame to terminate transmission of the DL data during the TTI based on a successful decode, wherein at least one symbol of the UL slot is replaced by the ETI.

8 Claims, 12 Drawing Sheets

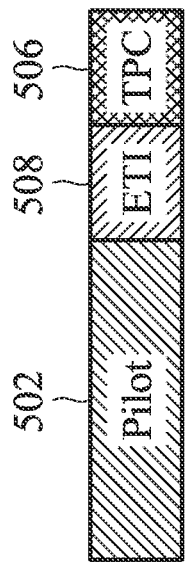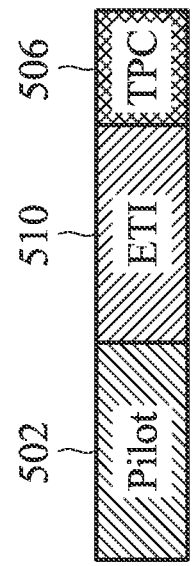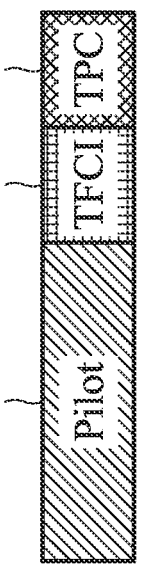

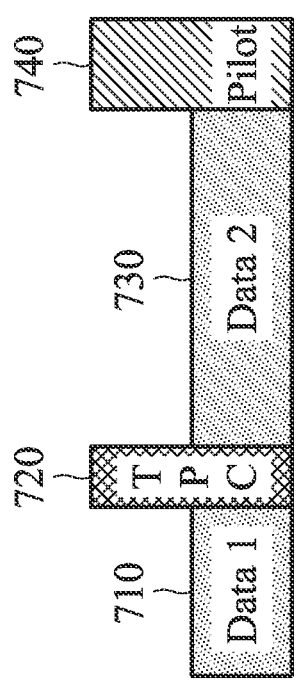
FIG. 7A
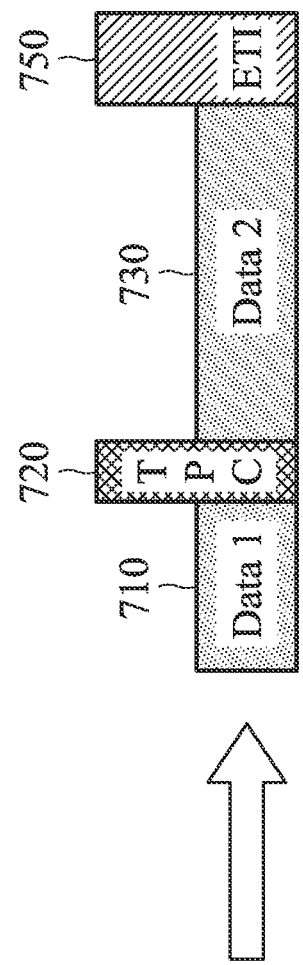
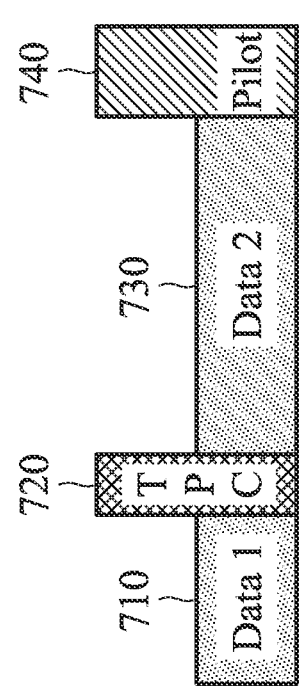
FIG. 7B

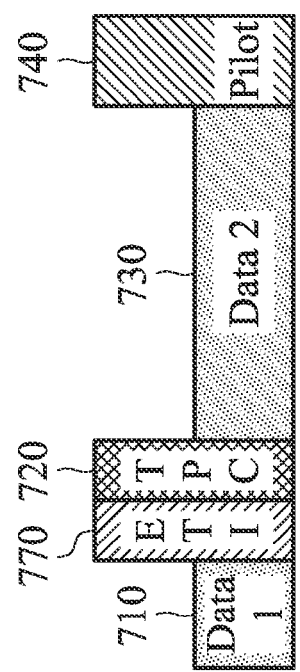
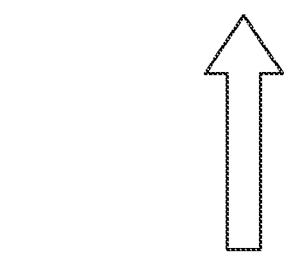
FIG. 7C
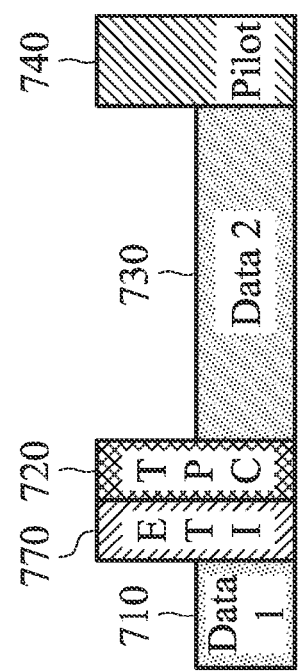
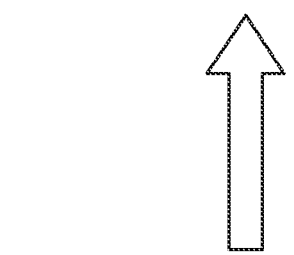
FIG. 7D

METHOD AND APPARATUS FOR EARLY TERMINATION OF TRANSMISSION

CROSS REFERENCE TO RELATED APPLICATIONS

This Application claims priority of U.S. Provisional Patent Application No. 61/821,332, filed on May 9, 2013, the entirety of which is incorporated by reference herein.

BACKGROUND OF THE INVENTION

Field of the Invention

Aspects of the present invention relate generally to wireless communications systems, and more particularly, to methods and apparatuses for early termination of transmission.

Description of the Related Art

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques. For example, such systems can conform to standards such as Third-Generation Partnership Project 2 (3GPP2, or "CDMA2000"), Third-Generation Partnership (3GPP, or "Wideband Code Division Multiple Access (W-CDMA)"), or Long Term Evolution ("LTE").

FIG. 1 illustrates timing diagrams associated with a prior art signaling scheme for W-CDMA. It will be appreciated that the signaling scheme shown in FIG. 1 may describe either the downlink or the uplink.

In FIG. 1, each transport channel has a Transmission Time Interval (TTI) of 20 ms, and one TTI consists of two frames, each frame has 15 slots (slot #0 to slot #14 and slot #15 to slot #29). The transmitted data slots are received by a UE 120. In the prior art, the UE 120 collects the data slot #0 to slot #11 and attempts to decode the data. In Decoding attempt 1, the UE 120 does not decode the data successfully, and therefore the UE 120 sends a NACK to Node B 110. In Decoding attempt 2, the UE 120 collects the data slot #0 to slot #15 and attempts to decode the data. After a decoding processing time, the UE 120 decodes the data successfully. The UE 120 sends an ACK to Node B 110 to stop the remaining transmission in the TTI.

However, in W-CDMA architecture, a transmission scheme regarding the use of an early termination indicator (ETI) has not been proposed. Therefore, it would be desirable to provide techniques for terminating transmission of data in a W-CDMA system or other systems which have no ETI transmission to reduce transmission power and efficiently improve the capacity of the wireless communications systems.

BRIEF SUMMARY OF THE INVENTION

A detailed description is given in the following embodiments with reference to the accompanying drawings.

Methods and apparatuses for early termination of transmission are provided.

In one exemplary embodiment, the invention is directed to a method for early termination of transmission. The method comprises: receiving downlink (DL) data from a DL channel during a transmission time interval (TTI); attempting to decode the received DL data before receiving all DL data of the TTI; and transmitting an early termination indicator (ETI) in an uplink (UL) slot of a UL radio frame to terminate transmission of the DL data during the TTI based on a successful decode, wherein at least one symbol of the UL slot is replaced by the ETI.

In one exemplary embodiment, the invention is directed to a method for early termination of transmission. The method comprises: receiving uplink (UL) data from a UL channel during a transmission time interval (TTI); attempting to decode the received UL data before receiving all UL data of the TTI; and transmitting an early termination indicator (ETI) in a downlink (DL) slot of a DL radio frame to terminate transmission of the UL data during the TTI based on a successful decode, wherein at least one symbol of the DL slot is replaced or reserved for the ETI.

In one exemplary embodiment, the invention is directed to an apparatus. The apparatus operates as a User Equipment (UE), and comprises a receiver, a processor and a transmitter. The receiver is configured to receive downlink (DL) data from a DL channel during a transmission time interval (TTI). The processor is coupled to the receiver and configured to attempt to decode the received DL data before receiving all DL data of the TTI. The transmitter is coupled to the processor and configured to transmit an early termination indicator (ETI) in an uplink (UL) slot of a UL radio frame to terminate transmission of the DL data during the TTI based on a successful decode, wherein at least one symbol of the UL slot is replaced by the ETI.

In one exemplary embodiment, the invention is directed to an apparatus. The apparatus operates as a Node B, and comprises a receiver, a processor and a transmitter. The receiver is configured to receive uplink (UL) data from a UL channel during a transmission time interval (TTI). The processor is coupled to the receiver and configured to attempt to decode the received UL data before receiving all UL data of the TTI. The transmitter is coupled to the processor and configured to transmit an early termination indicator (ETI) in a downlink (DL) slot of a DL radio frame to terminate transmission of the UL data during the TTI based on a successful decode, wherein at least one symbol of the DL slot is replaced or reserved for the ETI.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 5A illustrates a slot format of a UL DPCCH slot according to an embodiment of the invention.

FIGS. 5B and 5C illustrate a slot format for transmission of an ETI on the downlink in a W-CDMA system according to an embodiment of the invention.

FIG. 7A illustrates a slot format of a DL DPCH slot according to an embodiment of the invention.

FIGS. 7B to 7E illustrate a slot format for transmission of an ETI on the uplink in a W-CDMA system according to an embodiment of the invention.

DETAILED DESCRIPTION OF THE INVENTION

Figure 1:
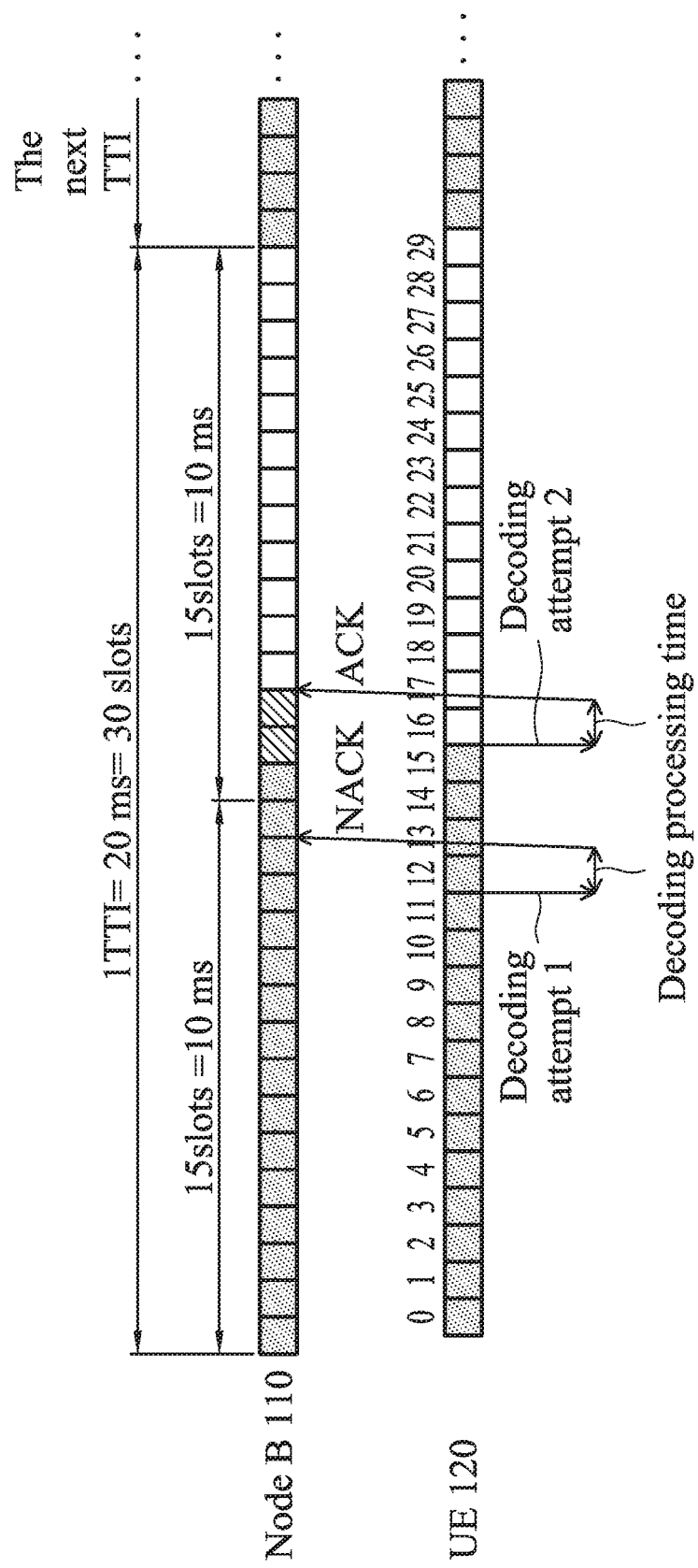
FIG. 1 illustrates timing diagrams associated with a prior art signaling scheme for W-CDMA.

Several exemplary embodiments of the present disclosure are described with reference to FIGS. 2 through 9, which generally relate to a method and an apparatus for early termination of transmission. It is to be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The exemplary wireless communications systems and devices described below employ a wireless communications system supporting a broadcast service. Wireless communications systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

Figure 2:
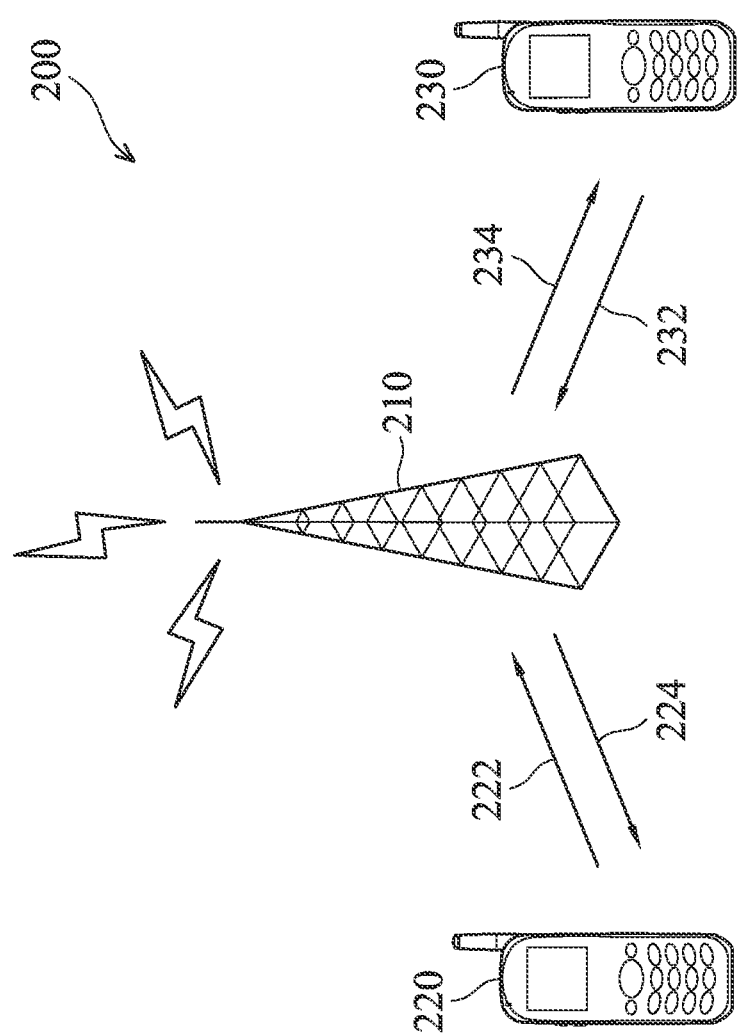
FIG. 2 is a schematic diagram of a multiple access wireless communications system according to one embodiment of the present invention.

FIG. 2 is a schematic diagram of a multiple access wireless communications system 200 according to one embodiment of the present invention. The multiple access wireless communications system 200 includes a Node B 210, user equipment (UE) 220 and 230. The UE 220 is in communication with a first group of antennas (not shown in FIG. 2), where the first group of antennas transmit information to the UE 220 over a downlink (DL) 224 (also known as a forward link) and receive information from the UE 220 over an uplink (UL) 222 (also known as a reverse link). The UE 230 is in communication with a second group of antennas (not shown in FIG. 2) (or the same first group of antennas), where the second group of antennas transmit information to the UE 230 over a DL 234 and receive information from the UE 230 over an UL 232. In a Frequency Division Duplexing (FDD) system, communication links 222, 224, 232 and 234 may use different frequencies for communication. For example, the DL 224 may use a different frequency than that used by the UL 222.

A Node B may be a fixed station or base station used for communicating with the terminals and may also be referred to as an access point, an access network (AN), a base station, an enhanced base station, an eNodeB, or some other terminology. The user equipment (UE) may also be called an access terminal (AT), a wireless communications device, terminal, or some other terminology. The Node B 210 and the UE 220 and 230 in FIG. 2 at least includes a transmitter (not shown), and a receiver (not shown) and a processor (not shown), respectively, wherein the transmitter and the receiver are coupled to the processor.

While certain exemplary embodiments of the present disclosure may be described for operation according to the W-CDMA standard, one of ordinary skilled in the art will appreciate that the techniques may readily be applied to other digital communications systems. For example, the techniques of the present disclosure may also be applied to systems based on the CDMA2000 wireless communications standard, and/or any other communications standards. Such alternative exemplary embodiments are contemplated to be within the scope of the present disclosure.

The upper signaling layers of a W-CDMA system support data transmission on one or more transport channels to a specific terminal, with each transport channel being capable of carrying data for one or more services. These services may include voice, video, packet data, and so on, which are collectively referred to herein as "data."

In W-CDMA, data to be transmitted to a particular terminal is processed as one or more transport channels at a higher signaling layer. The transport channels are then mapped to one or more physical channels assigned to the terminal for a communication (e.g., a call). In W-CDMA, a downlink dedicated physical channel (DL DPCH) is typically assigned to each access terminal for the duration of a communication. The DL DPCH is used to carry the transport channel data in a time-division multiplexed manner along with control data (e.g., pilot, power control information, and so on). The DL DPCH may thus be viewed as a multiplex of a downlink dedicated physical data channel (DPDCH) and a downlink dedicated physical control channel (DPCCH), as described below. The transport channel data is mapped only to the DPDCH, while the DPCCH includes the physical layer signaling information.

Figure 3A:
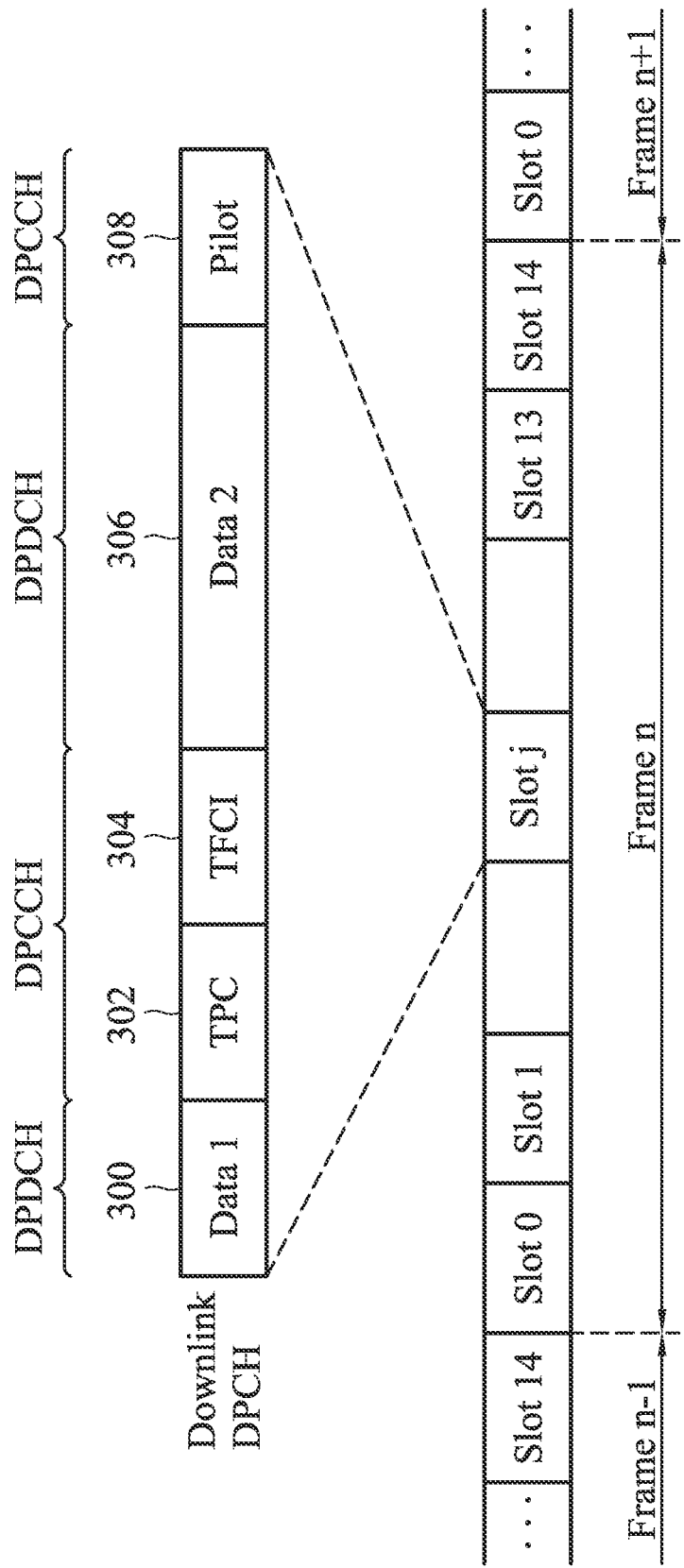
FIG. 3A is a diagram of a frame and slot format for the downlink data physical channel (DPCH), as defined by the W-CDMA standard.

FIG. 3A is a diagram of a frame and slot format for the downlink dedicated physical channel (DPCH), as defined by the W-CDMA standard. The data to be transmitted on the DL DPCH is partitioned into radio frames, with each radio frame being transmitted over a (10 ms) frame that comprises 15 slots labeled as slot #0 through slot #14. Each slot is further partitioned into a number of fields used to carry user-specific data, signaling, and pilot, or a combination thereof.

As shown in FIG. 3A, for the DL DPCH, each slot includes data fields 300 and 306 (Data 1 and Data 2), a transmit power control (TPC) field 302, a transport format combination indicator (TFCI) field 304, and a pilot field 308. The Data fields 300 and 306 are used to send user-specific data. The TPC field 302 is used to send power control information to direct the terminal to adjust its uplink transmit power either up or down to achieve the desired uplink performance while minimizing interference to other terminals. The TFCI field 304 is used to send information indicative of the transport format of the DL DPCH and a downlink shared channel (DSCH), if any, assigned to the terminal. The Pilot field 308 is used to send a dedicated pilot.

Figure 3B:
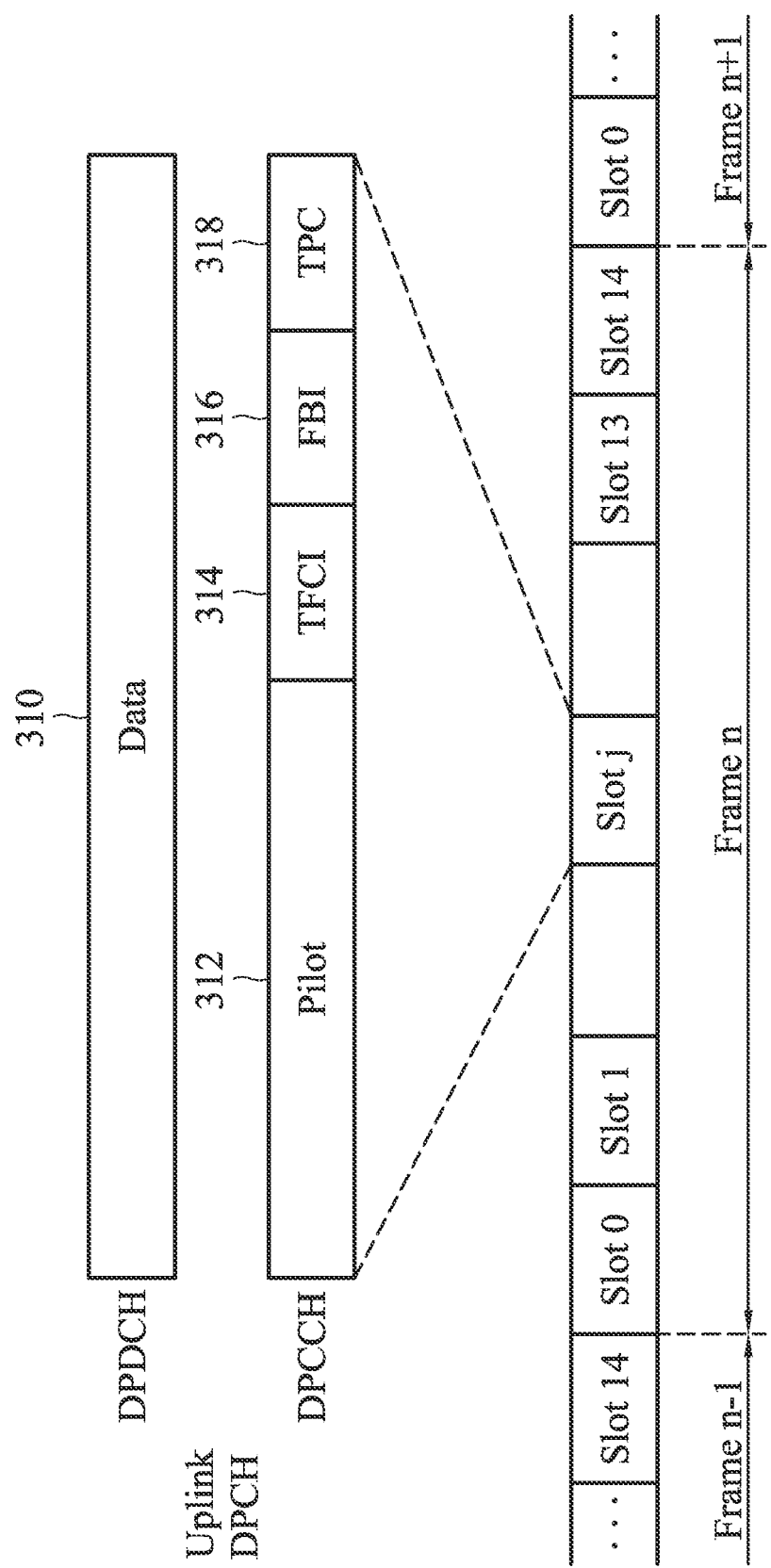
FIG. 3B is a diagram of a frame and slot format for the uplink data physical channel (DPCH), as defined by the W-CDMA standard.

FIG. 3B is a diagram of a frame and slot format for the uplink data physical channel (DPCH), as defined by the W-CDMA standard. As shown in FIG. 3B, for the UL DPCH, each slot includes a Data field 310, a Pilot field 312, a Transport Format Combination Indicator (TFCI) field 314, a Feedback Information (FBI) field 316, and a Transmit Power Control (TPC) field 318. The FBI field 316 may support feedback for use in, for example, closed-loop transmit diversity.

The transmissions described below may be an operation according to the W-CDMA standard. Note the exemplary embodiment is shown for illustrative purposes only, and is not meant to limit the scope of the present disclosure to systems based on W-CDMA. One of ordinary skilled in the art will also appreciate that specific parameters such as number and transport format of transport channels, slot or frame timings, slot intervals and timings at which decoding attempts are made, etc., are shown for illustrative purposes only, and are not meant to limit the scope of the present disclosure.

Figure 4:
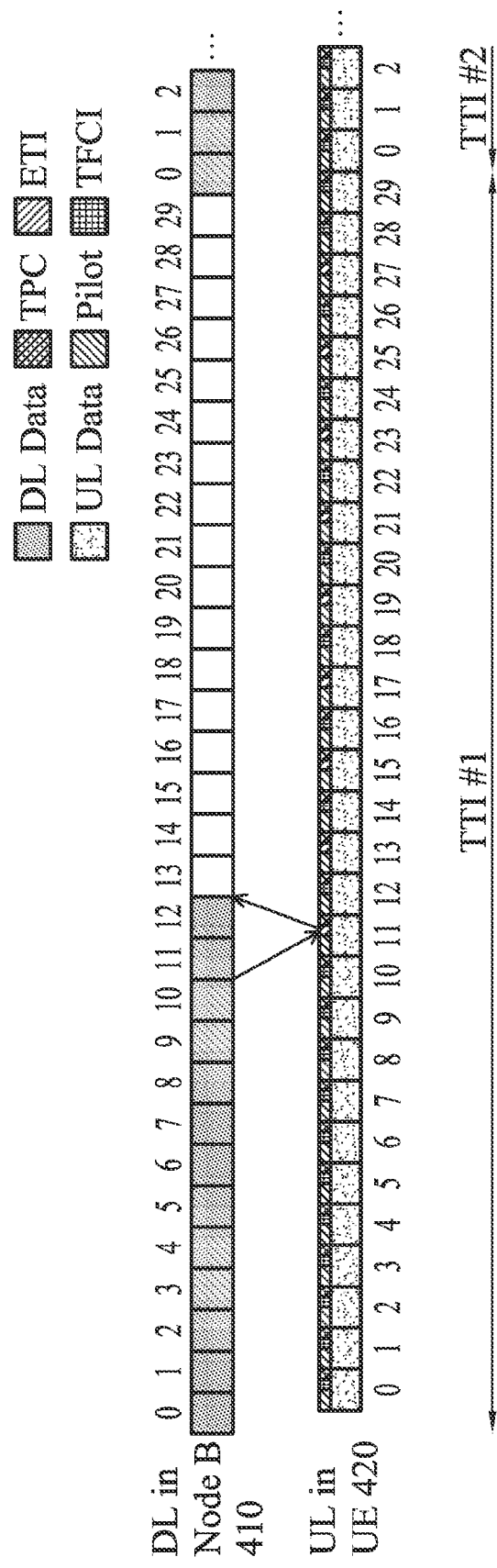
FIG. 4 illustrates a timing diagram for early termination of transmission on the downlink according to an embodiment of the present invention with reference to FIG. 2.

FIG. 4 illustrates a timing diagram for early termination of transmission on the downlink according to an embodiment of the present invention with reference to FIG. 2.

In FIG. 4, DL slots of the DL channel are transmitted by a Node B 410. The transmitted slots are received by a UE 420. The Node B 410 in FIG. 4 can be utilized for realizing the Node B 210 in FIG. 2, and the UE 420 in FIG. 4 can be utilized for realizing the UE 220 or 230 in FIG. 2. After a decoding processing time (not shown in FIG. 4), the UE 420 decodes the received DL data successfully and transmits an early termination indicator (ETI) in an UL slot #11 of the UL frame to the Node B 410. In an exemplary embodiment, the ETI may be used to notify the Node B 410 that the UE 420 has been correctly decoded according to the transmitted DL slots, so that the Node B 410 may not transmit the remaining slot(s) in TTI #1. In the embodiment shown in FIG. 4, after receiving the ETI in the UL slot #11, the Node B 410 terminates the transmission for the remaining slot(s) of TTI #1, and then restarts the transmission from the next TTI, TTI #2. In another embodiment, the time intervals for transmitting the ETIs for each transport channel may be chosen as a predetermined parameter. For example, the ETIs may be transmitted every two slots from the slot #11. Alternatively, the ETIs may be transmitted aperiodically during the TTI #1.

The mechanism for ETI transmission may utilize the techniques described below with reference to FIGS. 5A, 5B, and 5C.

FIG. 5A illustrates a slot format of a UL DPCCH slot according to an embodiment of the invention, comprising a Pilot field 502, a TFCI field 504 and a TPC field 506. The slot format may contain no FBI data. The data length of the Pilot field 502 for slot form is 6 symbols, the data length of the TFCI field 504 for slot form is 2 symbols, and the data length of the TPC field 506 for slot form is 2 symbols. In the present embodiment, the ETI transmission shown in FIG. 4 is used on the UL for early termination of DL transmissions.

In FIGS. 5B and 5C, two cases are provided for early termination of DL transmissions. As shown in FIG. 5B, in Case 1, 2 TFCI symbols in the TFCI field 504 of the UL slot may be replaced by the ETI symbols 508. In Case 2, if ETI needs better performance, 2 TFCI symbols in the TFCI field 504 and 2 Pilot symbols in the Pilot field 502 may be replaced by the ETI symbols 510, as shown in FIG. 5C. It will be understood that in alternative exemplary embodiments, control symbols not shown may also be replaced by the ETI symbols.

Figure 6:
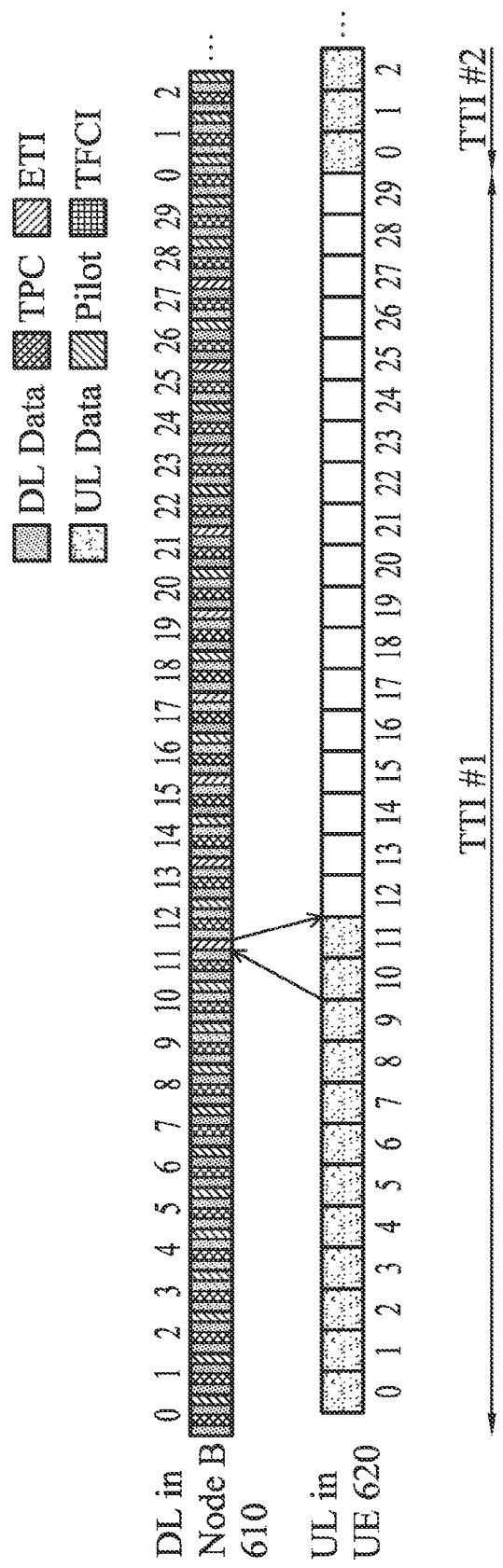
FIG. 6 illustrates a timing diagram for early termination of transmission on the uplink according to an embodiment of the present invention with reference to FIG. 2.

FIG. 6 illustrates a timing diagram for early termination of transmissions on the uplink according to an embodiment of the present invention with reference to FIG. 2.

In FIG. 6, UL slots of the UL channel are transmitted by a UE 620. The transmitted slots are received by a Node B 610. The UE 620 in FIG. 6 can be utilized for realizing the UE 220 or 230 in FIG. 2, and the Node B 610 in FIG. 6 can be utilized for realizing the Node B 210 in FIG. 2. After a decoding processing time (not shown in FIG. 6), the Node B 610 decodes the received UL data successfully and transmits an early termination indicator (ETI) in a DL slot #11 of a DL radio frame to the UE 620. In an exemplary embodiment, the ETI may be used to notify the UE 620 that the Node B 610 has correctly decoded UL data according to the transmitted UL slots, so that the UE 620 may not transmit the remaining slot(s) in TTI #1. In the embodiment shown in FIG. 6, after receiving the ETI in the DL slot #11, the UE 620 terminates the transmission for the remaining slot(s) of TTI #1, and then restarts the transmission from the next TTI, TTI #2. In another embodiment, the time intervals of transmitting the ETIs for each transport channel may be chosen as a predetermined parameter. For example, the ETIs may be transmitted every two slots from the slot #11. Alternatively, the ETIs may be transmitted aperiodically during the TTI #1.

The mechanism for ETI transmission may utilize the techniques described here in below with reference to FIGS. 7A to 7E.

FIG. 7A illustrates a slot format of a DL DPCH slot according to an embodiment of the invention, comprising a Data 1 field 710, a TPC field 720, a Data 2 field 730 and a Pilot field 740. TFCI field is omitted here for Blind Transport Format Detection (BTFD). The Data 1 field 710 and the Data 2 field 730 for each slot contain 17 Data symbols, the TPC field 720 for each slot contains 1 TPC symbol, and the Pilot field 740 for each slot contains 2 Pilot symbols. In the present embodiment, the ETI transmission shown in FIG. 6 is used on the DL for early termination of UL transmissions.

Figure 7E:
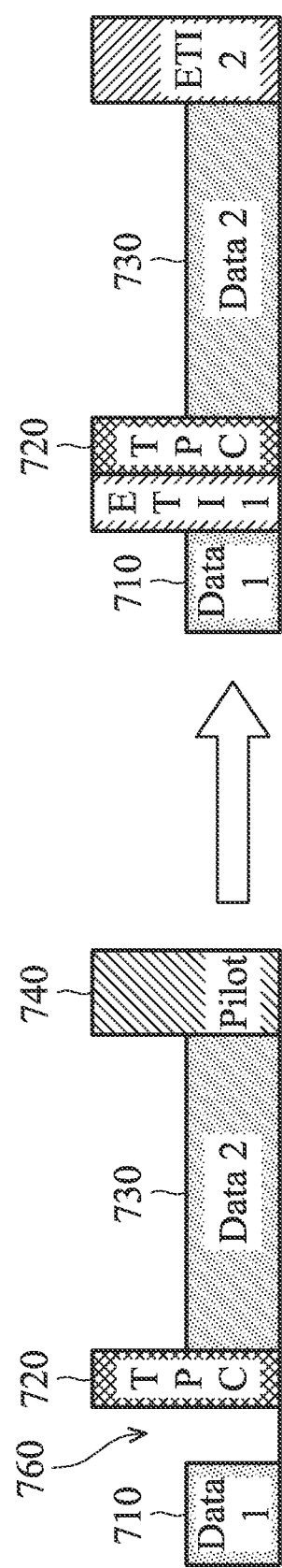

In FIGS. 7B to 7E, three cases are provided for early termination of UL transmissions. In case 1, at least one of the Pilot symbols, the TFCI symbols or part of the Data symbols of the DL slot may be replaced by the ETI symbols. For example, in FIG. 7B, the Pilot symbol in the Pilot field 740 is replaced by the ETI symbol 750. In Case 2, at least one symbol in the DL slot may be reserved for the ETI symbol 770. For example, the symbol may be a vacant symbol 760 as shown in FIG. 7C or one of the symbols in the DL slot such as one of the Data symbols in the Data 1 field 710 in FIG. 7D. In Case 3, the ETI symbols may be partitioned into two parts, ETI 1 and ETI 2. One part of the symbols in the DL slot is reserved for the ETI 1 and one part of the remaining symbols in the DL slot is replaced by the ETI 2. For example, in FIG. 7E, one vacant symbol 760 is reserved for the ETI 1, and the Pilot symbol in the Pilot field 740 is replaced by the ETI 2. It will be understood that in alternative exemplary embodiments, control symbols not shown may also be replaced by the ETI symbols, e.g., TFCI symbols, etc.

In another embodiment, the number of replaced or reserved symbols is adjusted according to early termination performance. Note FIGS. 5 and 7 are shown for illustrative purposes only, and are not intended to restrict the scope of the present disclosure to any particular exemplary embodiments shown.

Figure 8:
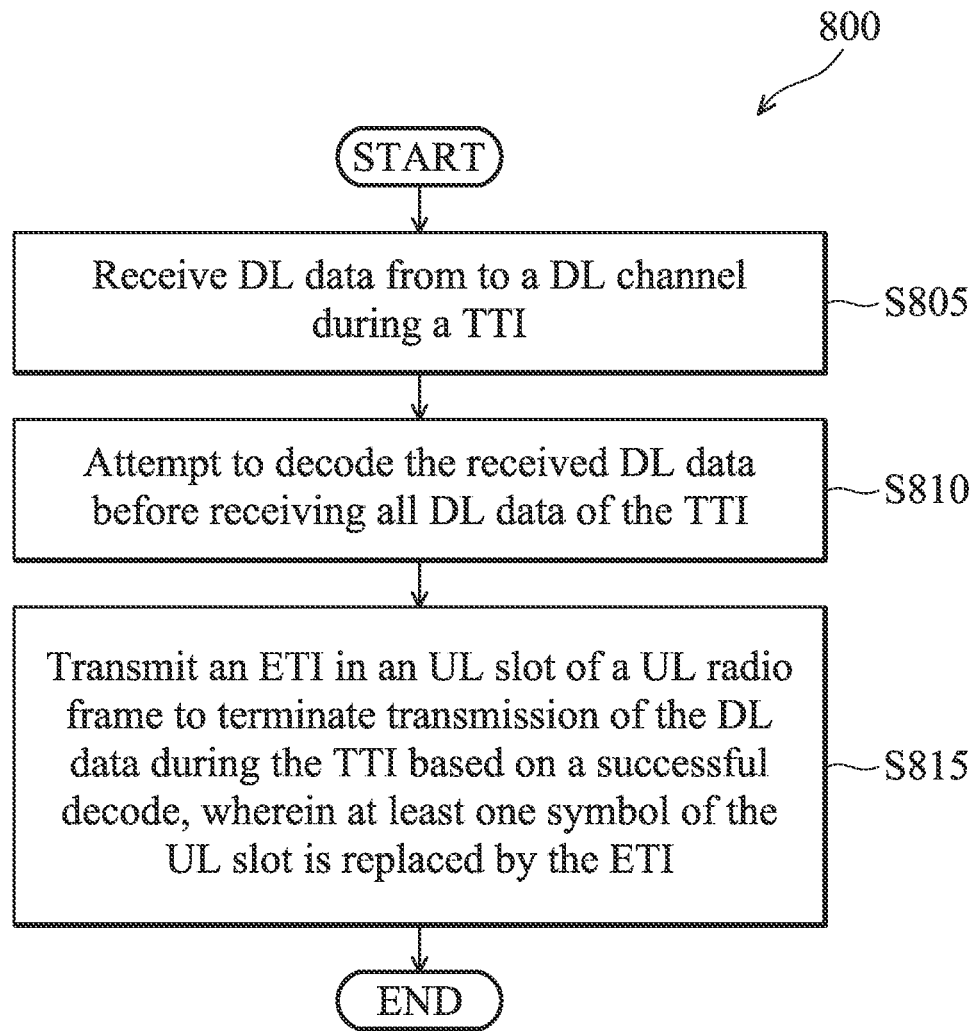
FIG. 8 is a flow diagram illustrating a method for early termination of transmission on the downlink according to the embodiment of the present invention with reference to FIG. 4.

FIG. 8 is a flow diagram illustrating a method 800 for early termination of transmission on the downlink according to the embodiment of the present invention with reference to FIG. 4. It is noted that the method is performed by a UE. First, in step S805, a receiver of a UE receives downlink (DL) data from a DL channel during a transmission time interval (TTI). Then, in step S810, a processor of the UE attempts to decode the received DL data before receiving all DL data of the TTI. Finally, in step S815, a transmitter of the UE transmits an early termination indicator (ETI) in an uplink (UL) slot of a UL radio frame to terminate transmission of the DL data during the TTI based on a successful decode, wherein at least one symbol of the UL slot is replaced by the ETI.

Figure 9:
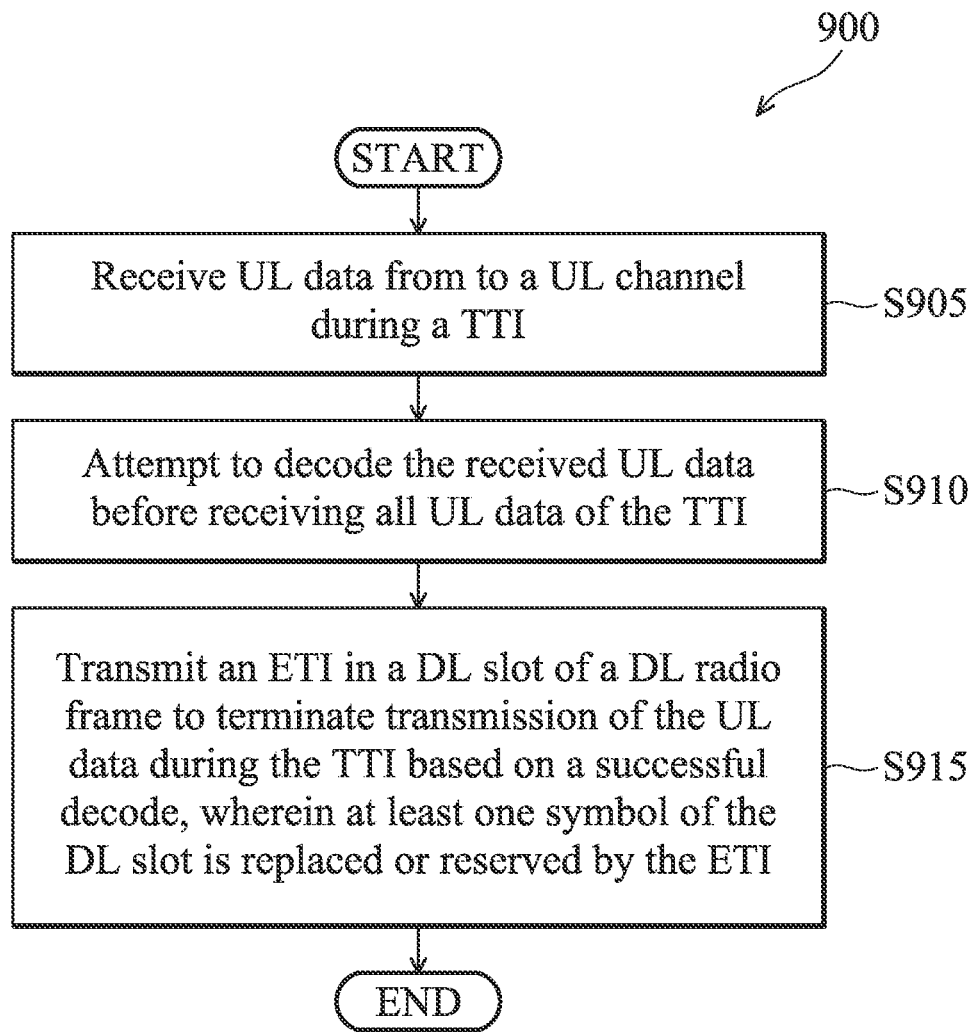
FIG. 9 is a flow diagram illustrating a method for early termination of transmission on the uplink according to the embodiment of the present invention with reference to FIG. 6.

FIG. 9 is a flow diagram illustrating a method 900 for early termination of transmission on the uplink according to the embodiment of the present invention with reference to FIG. 6. It is noted that the method is performed by a Node B. First, in step S905, a receiver of the Node B receives uplink (UL) data from a UL channel during a transmission time interval (TTI). Then, in step S910, a processor of the Node B attempts to decode the received UL data before receiving all UL data of the TTI. Finally, in step S915, a transmitter of the Node B transmits an early termination indicator (ETI) in a downlink (DL) slot of a DL radio frame to terminate transmission of the UL data during the TTI based on a successful decode, wherein at least one symbol of the DL slot is replaced or reserved by the ETI.

The methods and apparatus use the ETI to terminate the transmission, thereby reducing the data power transmission of the downlink or uplink, and increasing the system capacity.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for early termination of transmission, comprising:
   receiving downlink (DL) data from a DL channel during a transmission time interval (TTI);
   attempting to decode the received DL data before receiving all DL data of the TTI; and
   transmitting an early termination indicator (ETI) in an uplink (UL) slot of a UL radio frame to terminate transmission of the DL data during the TTI based on a successful decode,
   wherein at least one symbol of the UL slot is replaced by the ETI, and the symbol replaced by the ETI is the Transport Format Combination Indicator (TFCI) symbol.

2. The method for early termination of transmission as claimed in claim 1, wherein the ETI contains ETI symbols and the UL slot at least contains Pilot symbols, Transmit Power Control (TPC) symbols, or TFCI symbols.

3. The method for early termination of transmission as claimed in claim 1, wherein the number of the replaced symbols is adjusted according to early termination performance.

4. The method for early termination of transmission as claimed in claim 1, wherein the downlink data is received on a downlink of a W-CDMA system, and the ETI is transmitted on an uplink of the W-CDMA system.

5. An apparatus for early termination of transmission, operating as a User Equipment (UE), comprising:
   a receiver, configured to receive downlink (DL) data from a DL channel during a transmission time interval (TTI);
   a processor, coupled to the receiver and configured to attempt to decode the received DL data before receiving all DL data of the TTI; and
   a transmitter, coupled to the processor and configured to transmit an early termination indicator (ETI) in an uplink (UL) slot of a UL radio frame to terminate transmission of the DL data during the TTI based on a successful decode,
   wherein at least one symbol of the UL slot is replaced by the ETI, and the symbol replaced by the ETI is the Transport Format Combination Indicator (TFCI) symbol.

6. The apparatus for early termination of transmission as claimed in claim 5, wherein the ETI contains ETI symbols and the UL slot at least contains Pilot symbols, Transmit Power Control (TPC) symbols, or TFCI symbols.

7. The apparatus for early termination of transmission as claimed in claim 5, wherein the number of the replaced symbols is adjusted according to early termination performance.

8. The apparatus for early termination of transmission as claimed in claim 5, wherein the downlink data is received on a downlink of a W-CDMA system, and the ETI is transmitted on an uplink of the W-CDMA system.

* * * * *